US009212600B2

(12) United States Patent
Sasaki et al.

(10) Patent No.: US 9,212,600 B2
(45) Date of Patent: Dec. 15, 2015

(54) VARIABLE CYLINDER ENGINE

(71) Applicant: Mazda Motor Corporation, Aki-gun, Hiroshima (JP)

(72) Inventors: Junsou Sasaki, Hiroshima (JP); Kazutoyo Watanabe, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/155,273

(22) Filed: Jan. 14, 2014

(65) Prior Publication Data
US 2014/0216368 A1 Aug. 7, 2014

(30) Foreign Application Priority Data

Feb. 5, 2013 (JP) .................. 2013-020296

(51) Int. Cl.
*F02D 13/06* (2006.01)
*F01P 7/16* (2006.01)
*F02D 17/02* (2006.01)
*F02D 41/00* (2006.01)
*F02B 23/10* (2006.01)

(52) U.S. Cl.
CPC . *F01P 7/167* (2013.01); *F01P 7/16* (2013.01); *F02D 13/06* (2013.01); *F02D 17/02* (2013.01); *F02D 41/0087* (2013.01); *F02B 23/104* (2013.01); *Y02T 10/18* (2013.01)

(58) Field of Classification Search
CPC ... F01P 2003/024; F01P 2025/62; F01P 3/02; F01P 7/14; F01P 7/167; F01P 2025/08; F01P 7/165
USPC ............ 123/41.01, 41.08, 41.05, 41.1, 198 F; 701/101–105
See application file for complete search history.

(56) References Cited

U.S. PATENT DOCUMENTS

| 6,892,126 B2* | 5/2005 | Tashiro ................. B60W 30/18 477/107 |
| 7,267,084 B2* | 9/2007 | Lutze ........................ F01P 3/20 123/41.02 |
| 7,600,503 B2* | 10/2009 | Russell ................... F02D 13/06 123/198 A |
| 7,966,978 B2* | 6/2011 | Maehara ................. F02D 13/06 123/198 DB |
| 2003/0101961 A1* | 6/2003 | Foster ................ B60H 1/00314 123/198 F |
| 2010/0251977 A1* | 10/2010 | Warchuck ................. F01P 3/02 123/41.1 |
| 2012/0101691 A1* | 4/2012 | Otsuka .................. F02D 11/105 701/48 |
| 2012/0266827 A1* | 10/2012 | Nogawa ..................... F01P 3/02 123/41.02 |
| 2013/0174815 A1* | 7/2013 | Cleary ................ F02D 41/3836 123/557 |
| 2013/0255599 A1* | 10/2013 | Jentz ........................ F01P 11/14 123/41.1 |

FOREIGN PATENT DOCUMENTS

JP 2010270701 A 12/2010

* cited by examiner

*Primary Examiner* — Lindsay Low
*Assistant Examiner* — Long T Tran
(74) *Attorney, Agent, or Firm* — Alleman Hall McCoy Russell & Tuttle LLP (57) ABSTRACT

A variable cylinder engine is provided. The engine includes an engine body having a plurality of cylinders, a cooling mechanism for cooling the engine body, and a controller for controlling the cooling mechanism and changing a number of active cylinders according to an operating state of the engine. The controller reduces the number of active cylinders in a reduced-cylinder operating range set within a partial engine load range, and in a first reduced-cylinder range set within a high load part of the reduced-cylinder operating range, the controller improves a cooling performance of the cooling mechanism compared with that in a second reduced-cylinder range set within a low load part of the reduced-cylinder operating range.

20 Claims, 7 Drawing Sheets

VARIABLE CYLINDER ENGINE

BACKGROUND

The present invention relates to a variable cylinder engine having a plurality of cylinders and which performs a reduced-cylinder operation where one or more of the plurality of cylinders are deactivated.

As variable cylinder engines, JP2010-270701A discloses a variable cylinder engine. Specifically, in JP2010-270701A, in a transition to a reduced-cylinder operation, a control of stopping a lift operation of an intake valve to be deactivated is performed. Therefore, the engine in JP2010-270701A includes a mechanism for stopping the operation of the intake valve (valve stopping mechanism). However, since the mechanism is a hydraulic type, due to an increase in viscosity of oil used in the hydraulic control when an engine coolant temperature is low, a period of time required to stop the intake valve of the cylinder to be deactivated (required period of time for the operation of the valve stopping mechanism) becomes long, and the transition to the reduced-cylinder operation may not be performed smoothly.

Therefore, in JP2010-270701A, when the reduced-cylinder operation is requested, the engine coolant temperature is compared with a predetermined lower limit temperature, and when the coolant temperature is confirmed to be lower than the lower limit temperature, a working angle of the intake valve is reduced and a base circle section of a cam (the section spanning from the part causing the intake valve to close to the part causing the intake valve to open) is designed to be long. Thus, even under a condition where the engine coolant temperature is low, the stop operation of the intake valve is completed within the base circle section and the transition to the reduced-cylinder operation is performed smoothly. Therefore, the frequency of the reduced-cylinder operation increases and fuel consumption performance is improved.

On the other hand, in JP2010-270701A, when the engine coolant temperature is higher than the lower limit value, the control of reducing the working angle of the intake valve is not performed and the lift characteristic of the intake valve is set to be normal. However, when the reduced-cylinder operation is performed in this state, if an engine load is relatively increased and a burden on the active cylinder is increased, the temperature of the active cylinder increases and abnormal combustion may occur. In order to avoid such abnormal combustion, an upper limit load for performing the reduced-cylinder operation may be set low or an ignition timing may be significantly retarded to avoid abnormal combustion; however, neither method is preferable since the effect of improved fuel consumption will be reduced.

SUMMARY

The present invention is made in view of the above situations and provides a variable cylinder engine which performs a reduced-cylinder operation that results in excellent fuel consumption performance within a wide engine load range.

According to one aspect of the present invention, a variable cylinder engine is provided. The engine includes an engine body having a plurality of cylinders, a cooling mechanism for cooling the engine body, and a controller for controlling the cooling mechanism and changing a number of active cylinders according to an operating state of the engine. The controller reduces the number of the active cylinders in a reduced-cylinder operating range set within a partial engine load range. In a first reduced-cylinder range set within a high load part of the reduced-cylinder operating range, the controller improves a cooling performance of the cooling mechanism compared with that in a second reduced-cylinder range set within a low load part of the reduced-cylinder operating range.

According to this aspect of the present invention, the cooling performance of the cooling mechanism is improved and a temperature of the engine body is reduced in the first reduced-cylinder range where the engine load is relatively high within the reduced-cylinder operating range where the number of active cylinders is reduced. Therefore, even if the load corresponding to the first reduced-cylinder range is high to some extent, it is not required to significantly retard an ignition timing to prevent knocking (abnormal combustion caused by self-ignition of uncombusted end gas), and the reduced-cylinder operation with excellent fuel consumption performance can be performed continuously in a higher engine load range.

For example, if the cooling performance is not improved in the first reduced-cylinder range within the high load part, the temperature of each active cylinder may increase and knocking may occur. Such a situation can be avoided by either reducing an upper limit load of the first reduced-cylinder operating range to narrow the reduced-cylinder operating range, or significantly retarding the ignition timing to avoid knocking; however, the effect of improved fuel consumption cannot be obtained sufficiently in this case.

Whereas, when the cooling performance is improved in the first reduced-cylinder range within the high load part of this aspect, since knocking does not occur even if the retard of the ignition timing is reduced, the ignition timing can be relatively advanced, and the equivalent amount of torque can be obtained with a lesser injection amount. Thus, the reduced-cylinder operation with excellent fuel consumption performance can be performed continuously in a higher engine load range and the fuel consumption performance can sufficiently be improved.

The reduced-cylinder operating range may be set to a range where an engine speed is higher than a first predetermined reference speed. In an engine operation within a low-speed all-cylinder range where the engine speed is lower than the first reference speed, the cooling performance of the cooling mechanism is lower than that in the first reduced-cylinder range.

According to this configuration, under a condition where the flowability of a gas mixture inside a cylinder easily degrades due to the low engine speed, the engine body is not cooled unnecessarily and an increase in a generated amount of HC (Hydrocarbons) can be prevented.

The reduced-cylinder operating range may be set to a range where an engine speed is lower than a second predetermined reference speed. In an engine operation within a high-speed all-cylinder range where the engine speed is higher than the second reference speed, the controller may improve the cooling performance of the cooling mechanism similarly to the first reduced-cylinder range.

In an engine operation within a high-load all-cylinder range where the engine load is higher than the reduced-cylinder operating range, the controller may improve the cooling performance of the cooling mechanism, similarly to the first reduced-cylinder range.

When the cooling performance of the cooling mechanism is improved in the all-cylinder operating ranges respectively set on the higher speed side and the higher load side of the reduced-cylinder operating range (the high-speed all-cylinder range and the high-load all-cylinder range), the occurrence of knocking can surely be prevented in a part of the high-load all-cylinder range where the engine load is particularly high and a part of the high-speed all-cylinder range where the engine speed is particularly high (i.e., the parts where knocking easily occurs).

Here, although it can also be considered to improve the cooling performance only in the respective parts of the high-speed all-cylinder range and the high-load all-cylinder range where knocking easily occurs, in this case, for example, when the operating state of the engine is shifted from a corresponding position in the first reduced-cylinder range to either one of the high-speed all-cylinder range and the high-load all-cylinder range, it becomes necessary to often change the cooling performance of the cooling mechanism (e.g., change the cooling performance to high, to low, and then to high again). This not only complicates the control, but a problem also occurs with regard to responsiveness. Whereas, with the above configuration, the cooling performance of the cooling mechanism is improved throughout the high-speed all-cylinder range and the high-load all-cylinder range. Thus, the occurrence of knocking can surely be prevented while avoiding the problem described above.

The engine may be a vehicle engine to be installed in a vehicle. An output shaft of the engine body may be coupled to wheels via a transmission provided with a plurality of gear ranges. The controller may improve the cooling performance of the cooling mechanism only when the gear range of the transmission is higher than a predetermined range.

According to this configuration, the cooling performance can be improved without any unnecessary operation, under an appropriate condition taking a delay period of time required for the temperature of the engine body to actually decrease into consideration. Specifically, when the gear range of the transmission is low, the operating state of the engine shifts frequently and may be shifted up (the gear range may be changed to a high gear range) soon. Therefore, even if the cooling performance is improved when the gear range is low, when the temperature of each cylinder of the engine body is actually reduced, the operating state may have already been shifted to correspond to a position in the operating range where the cooling performance is not required to be improved (e.g., either one of the second reduced-cylinder range and the low-speed all-cylinder range). On the other hand, with the above configuration, the control of improving the cooling performance is only allowed when the gear range of the transmission is high (i.e., when the shift of the operating state is gentle and in a state close to cruising). Therefore, the temperature of the engine body can be considered to be able to be sufficiently reduced before the operating state shifts to correspond to a position in the operating range where the cooling performance is not required to be improved, even if some extent of a delay period of time exists until the temperature of the engine body actually decreases. Therefore, the control of improving the cooling performance will not be a waste.

The cooling mechanism may include a coolant path where a coolant circulates, a radiator for cooling the coolant by a heat exchange, and a switch valve for allowing the coolant to flow into the radiator through the coolant path by opening when a coolant temperature is higher than a predetermined reference temperature. The controller may improve the cooling performance of the cooling mechanism by reducing the reference temperature.

According to this configuration, the cooling performance of the cooling mechanism can appropriately be adjusted with the simple configuration where the reference temperature, which is the temperature at which the switch valve is opened, is changed.

DETAILED DESCRIPTION OF EMBODIMENTS (1) Overall Configuration of Engine

Figure 1:
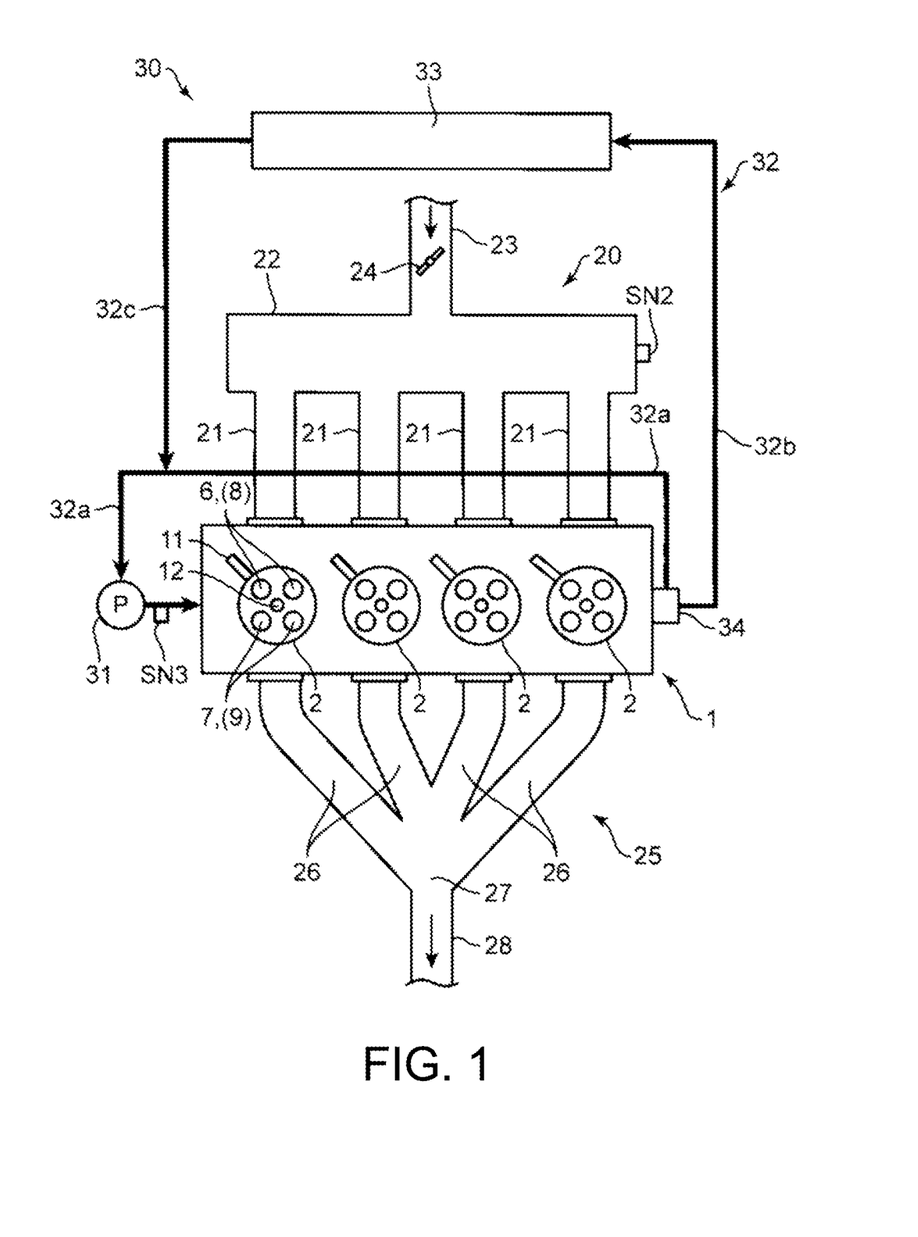
FIG. 1 is a plan view of an overall configuration of a variable cylinder engine according to one embodiment of the present invention.
Figure 2:
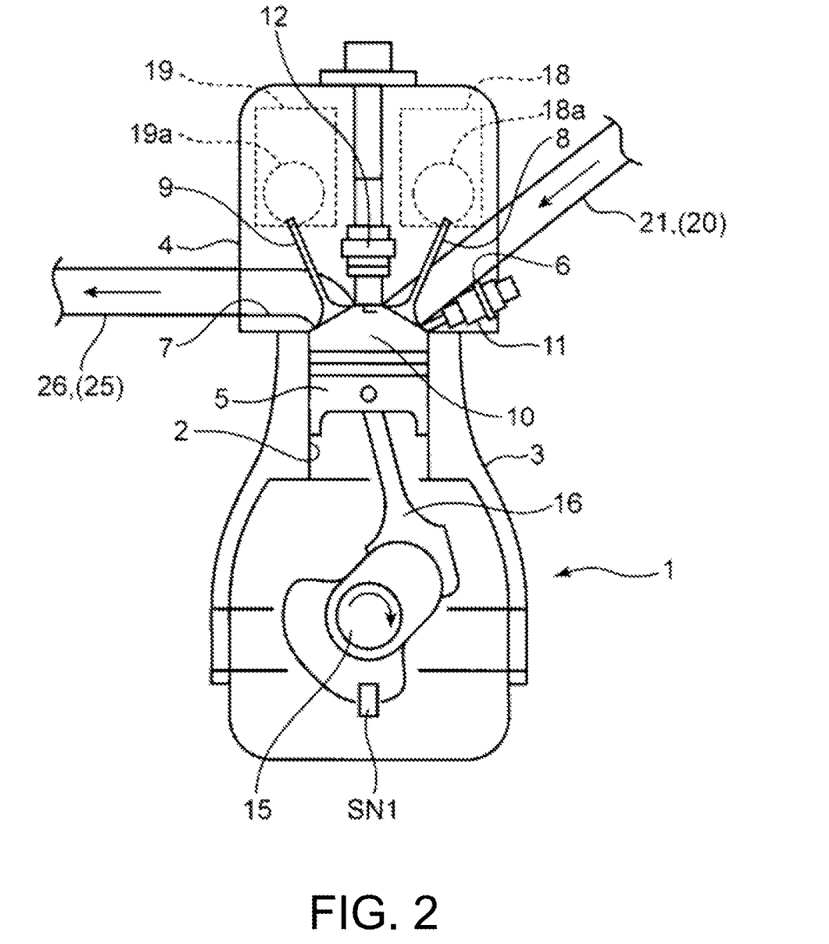
FIG. 2 is a cross-sectional view of a main part of the engine.

FIGS. 1 and 2 illustrate the configuration of a variable cylinder engine according to one embodiment of the present invention. The engine illustrated in FIGS. 1 and 2 is a multi-cylinder gasoline engine having four cycles, installed in a vehicle as a power source for traveling. Specifically, the engine includes an inline four-cylinder engine body 1, an intake passage 20 for introducing air into the engine body 1, an exhaust passage 25 for discharging exhaust gas generated in the engine body 1, and a cooling mechanism 30 for cooling the engine body 1. The engine body 1 has four cylinders 2 arranged in a line.

The engine body 1 includes a cylinder block 3 formed therein with the four cylinders 2, a cylinder head 4 provided on the cylinder block 3, and pistons 5 each reciprocatably fitted into the cylinder 2.

A combustion chamber 10 is formed above each piston 5, and fuel mainly containing gasoline is supplied to the combustion chamber 10 by being injected from an injector 11 (described later). Then, the injected fuel combusts in the combustion chamber 10, and the piston 5 pushed down by an expansion force produced by the combustion reciprocates in an up-and-down direction.

The piston 5 is coupled to a crankshaft 15 via a connecting rod 16. The crankshaft 15 is an output shaft of the engine body 1. The crankshaft 15 rotates around its central axis corresponding to the reciprocation of the piston 5.

Figure 3:
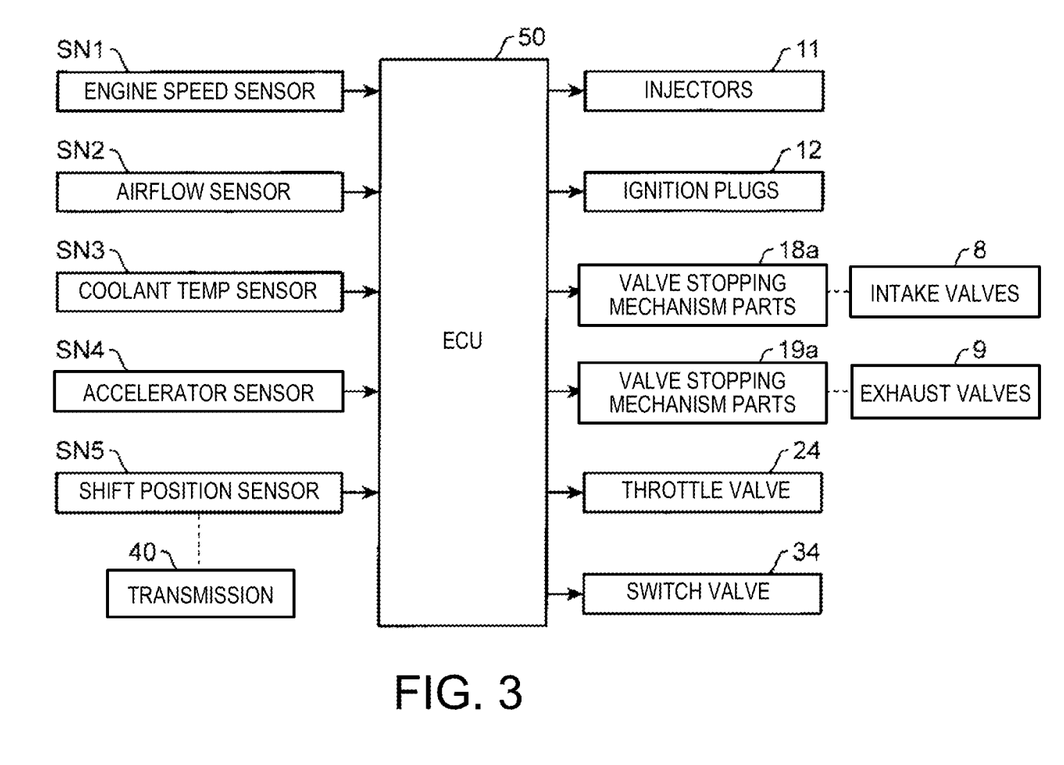
FIG. 3 is a block diagram illustrating a control system of the engine.

The crankshaft 15 is coupled to wheels (not illustrated) via a transmission 40 (FIG. 3). The transmission 40 is a multi-stage transmission having a plurality of gear ranges (e.g., six forward ranges and one reverse range) and is interlocked with a shift lever which is operated by a driver.

The cylinder block 3 is provided with an engine speed sensor SN1 for detecting a rotational speed of the crankshaft 15 as an engine speed.

In the cylinder head 4, a pair of injectors 11 for injecting the fuel (gasoline) into the combustion chamber 10 and a pair of ignition plugs 12 are provided for each cylinder 2. The pair of ignition plugs 12 supply ignition energy produced by a spark-discharge to a gas mixture containing the fuel injected from the injectors 11 and air.

With such a four-cycle four-cylinder gasoline engine of this embodiment, each piston 5 provided to each cylinder 2 moves in the up-and-down direction with a phase difference by 180° in crank angle (180° CA) with the adjacent piston(s). Correspondingly, the ignition timing in the cylinder 2 is also set to a timing shifted by 180° CA from the adjacent cylinder(s). Specifically, when the cylinders 2 are referred to as the first, second, third, and fourth cylinders from the left in FIG. 1, the ignition is performed in the order of the first cylinder, the third cylinder, the fourth cylinder, and then the second cylinder.

Note that although it is described later in detail, the engine of this embodiment is the variable cylinder engine for performing the operation of deactivating two of the four cylinders 2 while activating the other two of the cylinders 2, referred to as a reduced-cylinder operation. Thus, the ignition order described above applies to a normal operation which is not the reduced-cylinder operation (an all-cylinder operation where all of the four cylinders 2 are active). On the other hand, in the reduced-cylinder operation, the ignition operations of the ignition plugs 12 are controlled so that the ignitions are only performed in two of the cylinders of which ignition order is not adjacent; thus, the ignition is performed in every other cylinder with respect to ignition order.

The geometric compression ratio of each cylinder 2, in other words, a ratio between a volume of the combustion chamber 10 when the piston 5 is at a bottom dead center and a volume of the combustion chamber 10 when the piston 5 is at a top dead center is set slightly high for a gasoline engine, which is 12:1 or higher.

The cylinder head 4 includes: intake ports 6 for introducing, into the combustion chambers 10 of the respective cylinders 2, air supplied from the intake passage 20; exhaust ports 7 for discharging, to the exhaust passage 25, exhaust gas generated in the combustion chambers 10 of the respective cylinders 2; intake valves 8 for opening and closing openings of the respective intake ports 6 on the combustion chamber 10 side; and exhaust valves 9 for opening and closing openings of the respective exhaust ports 7 on the combustion chamber 10 side. Note that in this embodiment, two intake valves 8 and two exhaust valves 9 are provided for each cylinder 2.

The intake valves 8 are opened and closed in cooperation with the rotation of the crankshaft 15, by a valve operating mechanism 18 including a pair of camshafts disposed in the cylinder head 4 (FIG. 2). The exhaust valves 9 are opened and closed in cooperation with the rotation of the crankshaft 15, by a valve operating mechanism 19 including a pair of camshafts disposed in the cylinder head 4 (FIG. 2).

The valve operating mechanism 18 for the intake valves 8 is incorporated with valve stopping mechanism parts 18a for stopping lift operations of the intake valves 8 for each cylinder 2 individually. Although any kind of valve stopping mechanism part 18a can be used as long as it can stop the lift operations of the intake valves 8, for example, a component including an input arm for swinging in cooperation with the cam in rotation, a transmission arm for transmitting the movement of the input arm to the intake valves 8, and a coupling pin coupling the input arm to the transmission arm may be used as the valve stopping mechanism part 18a. The coupling pin is driven back and forth in its axial direction by, for example, a hydraulic pressure, and can move between a projecting position where the input arm and the transmission arm are coupled to each other, and a retracted position where the coupling therebetween is undone. When the coupling pin is at the projecting position, since the input arm and the transmission arm are coupled to each other via the coupling pin, the movement of the input arm is transmitted to the transmission arm, and the lift operations of the intake valves 8 are performed. On the other hand, when the coupling pin is moved to the retracted position and the input arm and the transmission arm are uncoupled, the movement of the input arm is not transmitted to the transmission arm, and therefore, the lift operations of the intake valves 8 are stopped. In this embodiment, one valve stopping mechanism part 18a having such a structure is provided for each cylinder 2. Thus, the lift operations of the intake valves 8 of each cylinder 2 can be stopped individually.

Similarly, the valve operating mechanism 19 for the exhaust valves 9 is incorporated with valve stopping mechanism parts 19a for stopping lift operations of the exhaust valves 9 for each cylinder 2 individually. Note that since the specific configuration of the valve stopping mechanism parts 19a is similar to that of the valve stopping mechanism parts 18a for the intake valves 8, the description thereof is omitted.

The intake passage 20 is formed with four independent intake passages 21 communicating with the intake ports 6 of the respective cylinders 2, a surge tank 22 commonly connected with upstream end sections (end sections on an upstream side in a flow direction of intake air) of the independent intake passages 21, and a single intake pipe 23 extending upstream from the surge tank 22.

A throttle valve 24 for opening and closing to adjust a flow rate of intake air to be sucked into the engine body 1 is provided at an intermediate section of the intake pipe 23, and an airflow sensor SN2 for detecting the flow rate of the intake air is provided at the surge tank 22.

The exhaust passage 25 is formed with four independent exhaust passages 26 communicating with the exhaust ports 7 of the respective cylinders 2, a manifold section 27 where downstream end sections (end sections on a downstream side in a flow direction of exhaust air) of the independent exhaust passages 26 merge together, and a single exhaust pipe 28 extending downstream from the manifold section 27.

The cooling mechanism 30 includes a coolant pump 31 for pressuring coolant for cooling the engine, a coolant path 32 for circulating the coolant pressured by the coolant pump 31, a radiator 33 for cooling the coolant, a switch valve 34 for switching the flow of the coolant inside the coolant path 32, and a coolant temperature sensor SN3 for detecting a temperature of the coolant.

The coolant path 32 is formed with: a first coolant path 32a for returning the coolant discharged from the engine body 1, to the engine body 1 again without passing through the radiator 33; a second coolant path 32b for introducing the coolant discharged from the engine body 1, into the radiator 33; and a third coolant path 32c for introducing the coolant discharged from the radiator 33, into a downstream section of the first coolant path 32a. The coolant introduced into the engine body 1 through the downstream section of the first coolant path 32a passes through a water jacket (not illustrated) formed inside the cylinder block 3 and the cylinder head 4 of the engine body 1, and then is discharged from the engine body 1 to be led out to either one of an upstream section of the first coolant path 32a and the second coolant path 32b through the switch valve 34.

The coolant pump 31 is, for example, comprised of a mechanical pump for pressuring the coolant by obtaining its drive force from the crankshaft 15 of the engine body 1, and is provided at a position in the vicinity of the engine body 1 on the downstream side with respect to a merging section of the third coolant path 32c and the first coolant path 32a.

The radiator 33 cools the coolant by a heat exchange with outdoor air and is disposed at a predetermined position inside an engine room which receives travel air of the vehicle. For example, in a case where the vehicle is a front-engine vehicle, the radiator 33 is disposed rearward of a front grille provided on a front face of the engine room, and the coolant inside the radiator 33 is cooled by outdoor air being introduced from an air port formed in the front grille and being blown to the radiator 33.

The switch valve 34 is, for example, comprised of an electric-detection type thermostat using a thermistor, and is provided in a branching section into the first coolant path 32a and the second coolant path 32b. The switch valve 34 can switch between a closed state where the flow of the coolant toward the second coolant path 32b is interrupted and an open state where the flow of the coolant toward the second coolant path 32b is allowed.

Specifically, when the temperature of the coolant detected by the coolant temperature sensor SN3 is lower than a predetermined reference temperature, the switch valve 34 is closed. Here, since the coolant only circulates within the first coolant path 32a, the temperature of the coolant gradually increases by the heat generated in the engine body 1. On the other hand, when the temperature of the coolant is higher than the reference temperature, the switch valve 34 is open, and the coolant also flows into the second coolant path 32b. In other words, the coolant led out from the engine body 1, not only circulates within the first coolant path 32a, but is also supplied to the radiator 33 through the second coolant path 32b to be cooled. The coolant, after being cooled in the radiator 33, is again returned back to the engine body 1 through the third coolant path 32c, etc. The degree to which the switch valve 34 here is opened may be varied continuously. By adjusting the degree in this manner, the flow rate of the coolant flowing into the radiator 33 may be arbitrarily adjusted. As the flow rate of the coolant into the radiator 33 is increased by opening the switch valve 34 further, the cooling performance correspondingly increases and the coolant temperature rapidly decreases.

(2) Control System

Next, a control system of the engine is described using FIG. 3. The respective components of the engine of this embodiment are overall controlled by an ECU (Engine Control Unit) 50. The ECU 50 is, as is well known, comprised of a microprocessor including a CPU (Central Processing Unit), a ROM (Read-Only Memory), and a RAM (Random Access Memory), and the ECU 50 may also be referred to herein as a controller.

The ECU 50 is sequentially inputted with information from the various sensors. Specifically, the ECU 50 is electrically connected to the engine speed sensor SN1, the airflow sensor SN2, and the coolant temperature sensor SN3 provided at the respective components of the engine. Moreover, the vehicle of this embodiment is provided with an accelerator sensor SN4 for detecting a degree of actuation of an acceleration pedal (accelerator actuation degree, not illustrated) controlled by the driver, and a shift position sensor SN5 for detecting a gear range of the transmission 40. The ECU 50 is also electrically connected to the accelerator sensor SN4 and the shift position sensor SN5. The ECU 50 acquires various information including the engine speed, the intake air amount, the coolant temperature, the accelerator actuation degree, and the gear range of the transmission 40, based on input signals from the sensors SN1 to SN5.

The ECU 50 performs various operations based on the input signals from the respective sensors (SN1 to SN5) while controlling the respective components of the engine. In other words, the ECU 50 is electrically connected with the injectors 11, the ignition plugs 12, the valve stopping mechanism parts 18a and 19a, the throttle valve 24, and the switch valve 34.

The ECU 50 outputs respective control signals to these components to drive the components based on the results of the operations, etc.

(3) Control According to Operating State

Next, specific contents of the engine control according to an operating state of the engine are described with reference to FIGS. 4 to 6.

Figure 4:
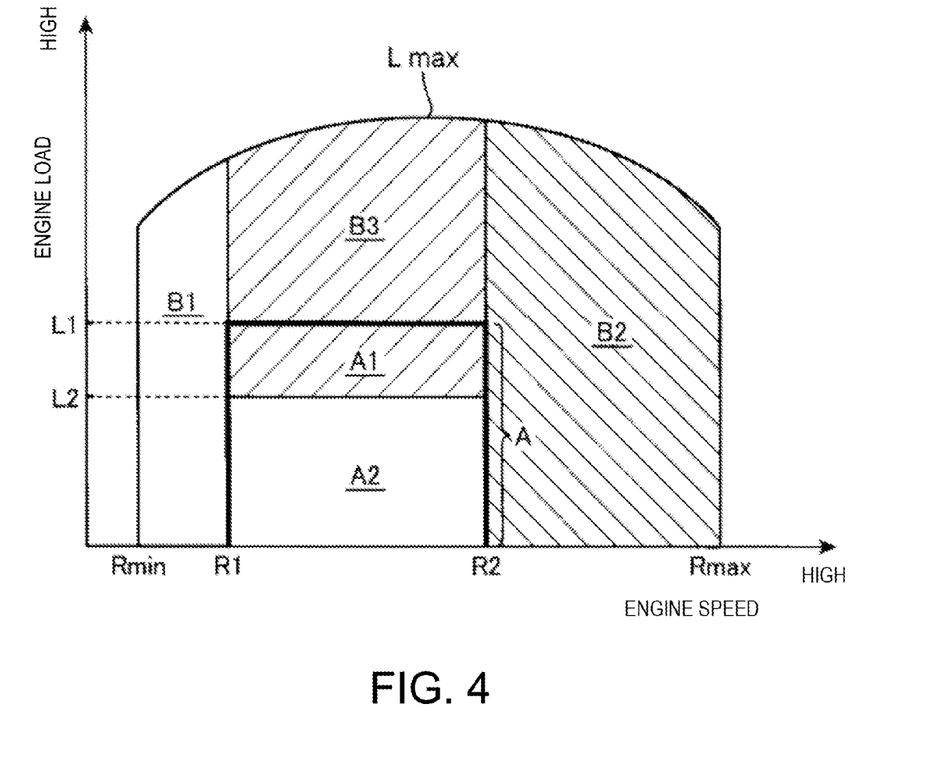
FIG. 4 is a map illustrating operating ranges of the engine which are divided according to a difference in control.

FIG. 4 is a map illustrating operating ranges of the engine which are divided into a plurality of ranges according to a difference in control, in which the engine load and the engine speed are indicated in the vertical axis and the horizontal axis, respectively. In this map, the operating range is roughly divided into a reduced-cylinder operating range A where the reduced-cylinder operation for deactivating two of the four cylinders 2 of the engine is performed, and ranges B1, B2, and B3 where other operation (in which the reduced-cylinder operation is not performed) is performed.

The reduced-cylinder operating range A is set in a range in an intermediate speed range where the engine speed is higher than a first predetermined reference speed R1 but lower than a second predetermined reference speed R2 and a partial load range where the engine load is lower than a predetermined reference load L1.

Further, the reduced-cylinder operating range A is divided, at a load L2 lower than the reference load L1, into a first reduced-cylinder range A1 where the engine load is higher than the load L2 and a second reduced-cylinder range A2 where the engine load is lower than the load L2.

Moreover, the ranges other than the reduced-cylinder operating range A (i.e., all-cylinder operating ranges where all the cylinders are active) are divided into the low-speed all-cylinder range B1 set in an engine speed range where the engine speed is lower than the first reference speed R1, the high-speed all-cylinder range B2 set in an engine speed range where the engine speed is higher than the second reference speed R2, and the high-load all-cylinder range B3 set in a range located between the ranges B1 and B2 and where the engine load is higher than the reference load L1.

The reduced-cylinder operation is not performed in any of the low-speed all-cylinder range B1, the high-speed all-cylinder range B2, and the high-load all-cylinder range B3 for the following reason.

In the low-speed all-cylinder range B1 where the engine speed is low, in a case where the reduced-cylinder operation has reduced the number of active cylinders to two, the combustion interval between the active cylinders becomes excessively long and engine vibration increases. For this reason, it is required to set the first reference speed R1, which is a lower limit speed in the reduced-cylinder operating range A, larger than an idling speed Rmin of the engine. As a result, the low-speed all-cylinder range B1 where the all-cylinder operation is performed is set in an engine speed range between the speed Rmin and the speed R1. Note that the first reference speed R1 can be set to about ⅙ of a rated speed Rmax of the engine.

On the other hand, in the reduced-cylinder operating range A, unlike a case where the all-cylinder operation is performed in the same range, it is required to inject substantially twice the amount of fuel into the active cylinders compared to the all-cylinder operation, which increases a burden on each active cylinder. Thus, if the reduced-cylinder operating range A is expanded carelessly, a possibility of knocking (i.e., abnormal combustion caused by self-ignition of uncombusted end gas during the flame propagation) occurring increases, particularly at a high engine load and a high engine speed in the reduced-cylinder operating range A. This is because the temperatures of the active cylinders increase due to an increase in an amount of fuel injected as the engine load increases and also an increase in heat generated per unit time as the engine speed increases. For this reason, it is required to set the second reference speed R2, which is an upper limit speed in the reduced-cylinder operating range A, and the reference load L1, which is an upper limit load in the reduced-cylinder operating range A, lower than the rated speed Rmax and a maximum load Lmax of the engine, respectively. As a result, the high-speed all-cylinder range B2 and the high-load all-cylinder range B3 are set between the rated speed Rmax and the second reference speed R2 and between the maximum load Lmax and the reference load L1, respectively. Note that the second reference speed R2 may be set to about ⅔ of the rated speed Rmax and the reference load L1 may be set to about ½ of the maximum load Lmax.

Next, the control operation performed by the ECU 50 during the engine operation is described in detail with reference to the flowcharts in FIGS. 5 and 6. Note that the processing illustrated in the flowcharts is performed under a condition that the engine is in a warmed-up state and, thus, the coolant temperature has increased to a predetermined value (e.g., 80° C.) or higher.

Figure 5:
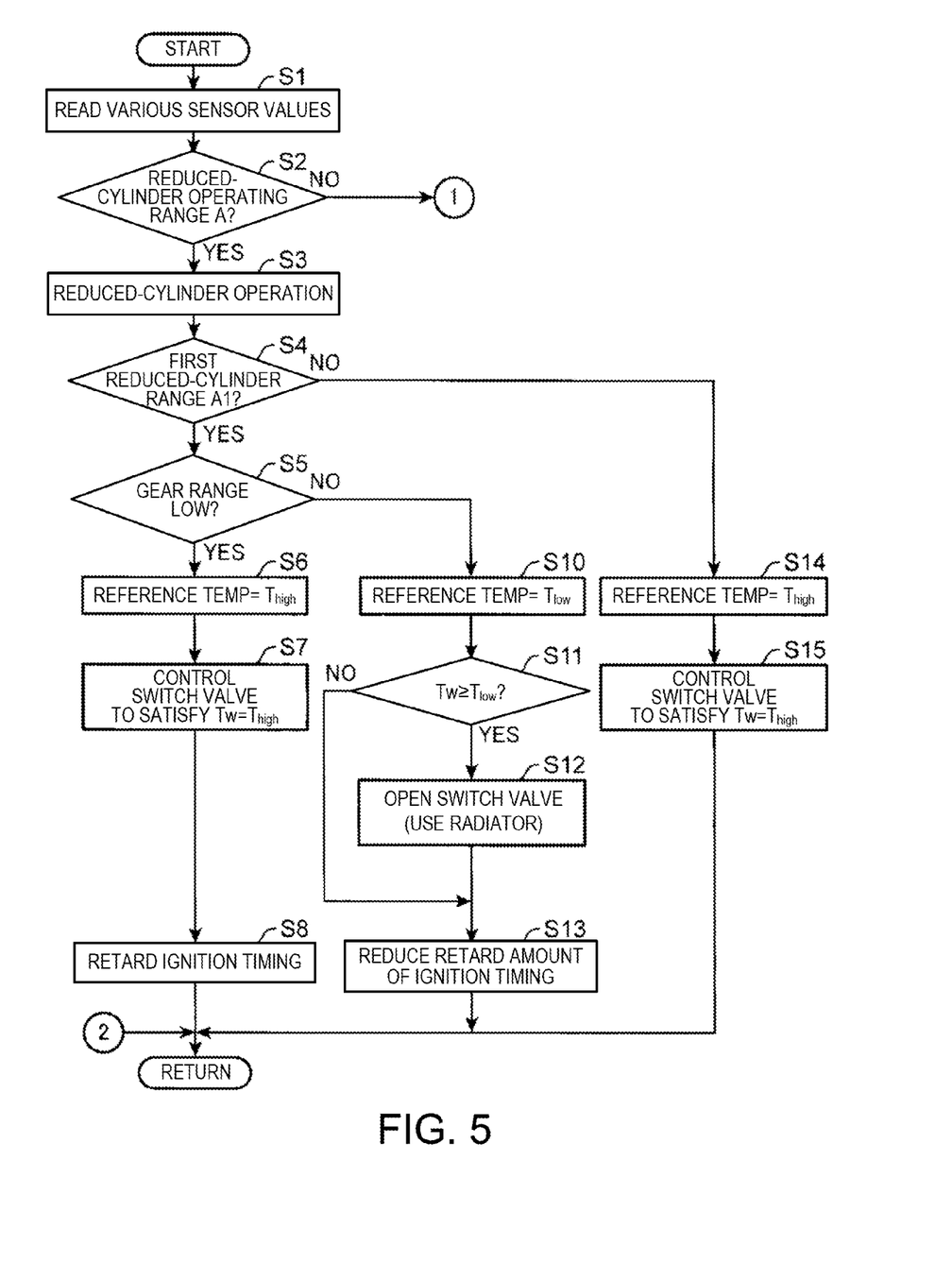
FIG. 5 is a first flowchart illustrating a flow of a control operation performed while the engine is in operation.
Figure 6:
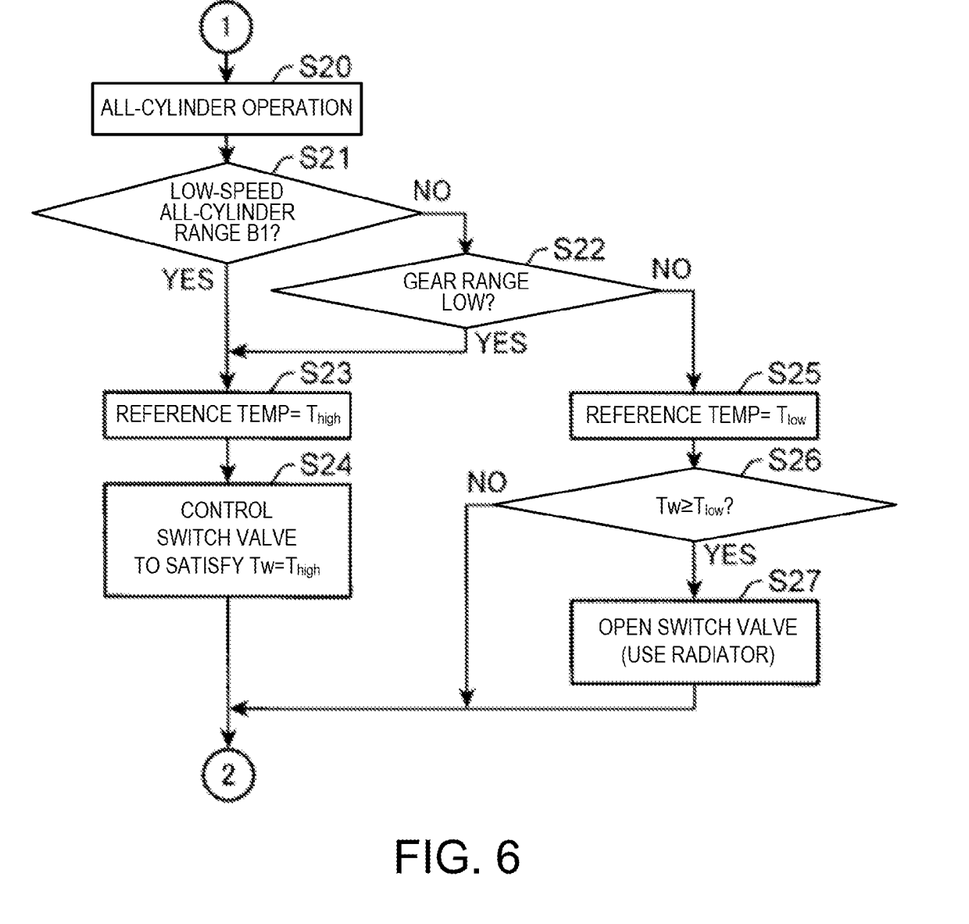
FIG. 6 is a second flowchart illustrating a flow of a control operation performed while the engine is in operation.

When the processing in FIG. 5 starts, the ECU 50 reads the various sensor values (S1). Specifically, the ECU 50 reads the respective detected signals from the engine speed sensor SN1, the airflow sensor SN2, the coolant temperature sensor SN3, the accelerator sensor SN4, and the shift position sensor SN5, so as to acquire various information including the engine speed, the intake air amount, the coolant temperature, the accelerator actuation degree, and the gear range of the transmission.

Next, based on the information read at S1, the ECU 50 determines whether the engine is operated in the reduced-cylinder operating range A (S2). Specifically, the ECU 50 determines the engine load and the engine speed based on the information acquired from the engine speed sensor SN1, the airflow sensor SN2, and the accelerator sensor SN4. The ECU 50 then determines whether an operating state of the engine obtained based on the engine load value and the engine speed value corresponds to a position within the reduced-cylinder operating range A illustrated in FIG. 4.

When it is confirmed that the engine is operated in the reduced-cylinder operating range A (S2: YES), the ECU 50 performs the reduced-cylinder operation where the number of active cylinders is reduced (S3). Specifically, the ECU 50 controls the injectors 11, the ignition plugs 12, and the valve stopping mechanism parts 18a and 19a of the respective cylinders 2 so that two of the four cylinders 2 of the engine body 1 are deactivated (only the other two cylinders 2 are active). More specifically, the operations of the injectors 11 and the ignition plugs 12 of the cylinders to be deactivated are stopped and the lift operations of the intake valves 8 and the exhaust valves 9 of the deactivated cylinders are stopped by driving the valve stopping mechanism parts 18a and 19a. Thus, the fuel injection and the ignition are stopped in the deactivated cylinders, and the combustion cannot be performed. Note that in the reduced-cylinder operation where two of the four cylinders 2 are deactivated, the combination of the deactivated cylinders 2 is selected such that the ignition order of the deactivated cylinders is not continuous. For example, either one of a combination of the first and fourth cylinders and a combination of the second and third cylinders is selected as the deactivated cylinders.

After the reduced-cylinder operation is started as described above, the ECU 50 determines whether the current operating state of the engine corresponds to a position within the first reduced-cylinder range A1 in which the engine load is relatively high within the reduced-cylinder operating range A (S4). Then, when it is confirmed that the engine operation is performed within the first reduced-cylinder range A1 (S4: YES), the ECU 50 determines whether the current gear range of the transmission 40 (acquired at S1) is lower than a predetermined range number (S5). Here, the "predetermined range number" is set to a relatively high range number among the plurality of gear ranges (at least higher than half of the highest range number) provided at the transmission 40. For example, when the transmission 40 has six forward ranges, the predetermined range number may be set to four. In this case, when the gear range is between the first range and the third range, the result of the determination at S5 is "YES," and when the gear range is between the fourth range and the sixth range, the result of the determination at S5 is "NO."

When the result of the determination at S5 is "YES," in other words, when it is confirmed that the engine is operated in the first reduced-cylinder range A1 within the high load part of the reduced-cylinder operating range A and the gear range of the transmission 40 is lower than the predetermined range number, the ECU 50 sets the reference temperature of the coolant, which is a temperature at which the switch valve 34 of the cooling mechanism 30 is opened (the temperature at which the coolant is allowed to flow into the radiator 33), to a predetermined normal reference temperature $T_{high}$ (S6). Note that the value of the normal reference temperature $T_{high}$ may be, for example, 88° C.

Sequentially, the ECU 50 controls the opening of the switch valve 34 so that the temperature of the coolant of the engine (hereinafter, the coolant temperature Tw) is kept to the normal reference temperature $T_{high}$ (S7). The normal reference temperature $T_{high}$ is set at S6. Specifically, the ECU 50 controls the opening of the switch valve 34 such that the switch valve 34 is opened when the coolant temperature Tw is higher than the normal reference temperature $T_{high}$, and the switch valve 34 is closed when the coolant temperature Tw is lower than the normal reference temperature $T_{high}$. Thus, the coolant flows into the radiator 33 and is cooled only when the coolant temperature Tw is higher than the normal reference temperature $T_{high}$ and, therefore, the coolant temperature Tw is kept within a value range close to the normal reference temperature $T_{high}$ without significantly exceeding or falling below the normal reference temperature $T_{high}$.

Sequentially, the ECU 50 retards the ignition timing of the ignition plug 12 from an MBT (Maximum Brake Torque), which is a timing that can exert a greatest torque (normally near a compression top dead center) (S8). Specifically, the ignition timing of the ignition plug 12 is normally set to the MBT, whereas at S8, the ignition timing is retarded from the MBT by a predetermined crank angle.

The ignition timing is retarded as described above to avoid abnormal combustion in the active cylinder. Specifically, in the first reduced-cylinder range A1 located within the high load part (higher than the load L2) of the reduced-cylinder operating range A where the number of active cylinders 2 is reduced, it is required to obtain a torque close to its maximum value with the active cylinders and the amount of heat generated in each active cylinder is large; therefore, knocking (abnormal combustion caused by self-ignition of uncombusted end gas) easily occurs. Therefore, to avoid such knocking, at S8, the ignition timing is retarded.

Next, a control operation in the case where the engine is operated in the first reduced-cylinder range A1 and the gear range of the transmission 40 is higher than the predetermined range number (e.g., fourth gear range or higher among six forward ranges) (S5: NO) is described. In this case, the ECU 50 sets the reference temperature of the coolant (the temperature at which the switch valve 34 is opened) to a low reference temperature $T_{low}$ which is lower than the normal reference temperature $T_{high}$ (S10). Note that the value of the low reference temperature $T_{low}$ may be, for example, 78° C.

Sequentially, the ECU 50 determines whether the current coolant temperature of the engine (acquired at S1) is higher than the low reference temperature $T_{low}$ (S11). The low reference temperature $T_{low}$ is set at S10. Then, when it is confirmed as $Tw \geq T_{low}$ (S11: YES), the ECU 50 controls the switch valve 34 to open so that the coolant flows into the radiator 33 (S12). Thus, the coolant is cooled by exchanging its heat in the radiator 33, and the coolant temperature Tw starts to decrease. On the other hand, when the coolant temperature Tw falls below the low reference temperature $T_{low}$ (S11: NO), the switch valve 34 is closed. Thus, the coolant temperature is not cooled anymore and the coolant temperature Tw is kept within a value range close to the low reference temperature $T_{low}$.

Here, the opening of the switch valve 34 opened at S12 is set larger as the coolant temperature Tw becomes higher than the low reference temperature $T_{low}$. Specifically, the flow rate of the coolant flowing into the radiator 33 is set larger as a temperature difference between the actual coolant temperature Tw and the low reference temperature $T_{low}$ (Tw−$T_{low}$) is larger, and the cooling performance is improved so that, as the temperature difference is larger, the coolant temperature Tw is reduced rapidly to be close to the low reference temperature $T_{low}$.

For example, if the coolant temperature Tw is within the value range close to the normal reference temperature $T_{high}$ described above immediately before the determination at S11, at S11, the coolant temperature Tw will be determined to be significantly higher than the low reference temperature $T_{low}$ (higher by approximately 10° C. if $T_{high}$=88° C. and $T_{low}$=78° C.). Therefore, at S12, the opening of the switch valve 34 is set sufficiently large. Thus, the flow rate of the coolant into the radiator 33 is increased and the cooling performance is sufficiently improved, resulting in rapidly decreasing the coolant temperature Tw and stimulating the cooling of the engine body 1.

After cooling the coolant as described above, the ECU 50 reduces the retard amount of the ignition timing (S13). Specifically, as described in the description of S8, in the first reduced-cylinder range A1 within the high load part of the reduced-cylinder operating range A, it is originally required to retard the ignition timing so as to avoid knocking; however, since the coolant temperature Tw of the engine is reduced to the low reference temperature $T_{low}$ here (S12 described above), the environment which easily causes knocking is improved. Therefore, knocking can be avoided even if the retard amount of the ignition timing is reduced, which enables the control at S13 for reducing the retard amount.

Next, a control operation in a case where the engine is operated in the second reduced-cylinder range A2 within the low load part (lower than the load L2) of the reduced-cylinder operating range A (S4: NO) is described. In this case, the ECU 50 sets the reference temperature of the coolant (temperature at which the switch valve 34 is opened) to the normal reference temperature $T_{high}$ (e.g., 88° C.) (S14) and controls the opening of the switch valve 34 so that the coolant temperature Tw of the engine is kept to the normal reference temperature $T_{high}$ (S15). Note that the ignition timing is not retarded and is set to the MBT which is the timing which exerts the largest torque.

Next, a control operation in a case where the engine is operated in a range other than the reduced-cylinder operating range A (any of the low-speed, high-speed and high-load all-cylinder ranges B1, B2 and B3) (S2: NO) is described with reference to FIG. 6. In this case, the ECU 50 performs the all-cylinder operation where all of the four cylinders 2 are active (S20). Specifically, the ECU 50 controls the injectors 11 and the ignition plugs 12 so that the fuel injection and the spark-ignition are performed in all the cylinders 2 of the engine body 1, and controls the valve stopping mechanism parts 18a and 19a not to be operated so that the intake and exhaust valves 8 and 9 of all the cylinders 2 are driven.

Sequentially, the ECU 50 determines whether the current operating state of the engine specified based on the information acquired at S1 corresponds to a position within the low-speed all-cylinder range B1 (S21). Further, when it is confirmed that the engine operation is performed in the all-cylinder range other than the low-speed all-cylinder range B1 (either one of the high-speed all-cylinder range B2 and the high-load all-cylinder range B3) (S21: NO), the ECU 50 determines whether the current gear range of the transmission 40 (acquired at S1) is lower than the predetermined range number described above (S22).

When it is confirmed that the engine is operated in the low-speed all-cylinder range B1 (S21: YES), or when it is confirmed that the current gear range of the transmission 40 is lower than the predetermined range number and the engine is operated in either one of the high-speed all-cylinder range B2 and the high-load all-cylinder range B3 (S22: YES), the ECU 50 sets the reference temperature of the coolant (the temperature at which the switch valve 34 is opened) to the normal reference temperature $T_{high}$ (e.g., 88° C.) (S23) and controls the opening of the switch valve 34 so that the coolant temperature Tw of the engine is kept at the normal reference temperature $T_{high}$ (S24).

On the other hand, when it is confirmed that the current gear range of the transmission 40 is the predetermined range number or higher and the engine is operated in either one of the high-speed all-cylinder range B2 and the high-load all-cylinder range B3 (S22: NO), the ECU 50 sets the reference temperature of the coolant to the low reference temperature $T_{low}$ (e.g., 78° C.) which is lower than the normal reference temperature $T_{high}$ (S25). Then, it is determined whether the current coolant temperature of the engine is higher than the low reference temperature $T_{low}$ (S26). When the result of the determination at S26 is YES and it is confirmed that $Tw \geq T_{low}$, the ECU 50 opens the switch valve 34 to allow the coolant to flow into the radiator 33 (S27). In other words, by reducing the reference temperature of the coolant at which the switch valve 34 is opened, the cooling performance of the cooling mechanism 30 is improved and the cooling of the engine body 1 is stimulated.

(4) Operation

As described above, the engine of this embodiment includes the engine body 1 having the plurality of (four) cylinders 2, the cooling mechanism 30 for cooling the engine body 1, and the ECU 50 (controller) for controlling the respective components of the engine including the cooling mechanism 30. The ECU 50 performs the reduced-cylinder operation where the number of active cylinders 2 is reduced in the reduced-cylinder operating range A set within the partial load range of the engine, and the ECU 50 performs the all-cylinder operation where all of the cylinders 2 are active in the other operating ranges (B1, B2 and B3). Particularly, when the engine is operated in the first reduced-cylinder range A1 set within the high load part of the reduced-cylinder operating range A and the gear range of the transmission 40 is higher than the predetermined range number (in FIG. 5, S5: NO), the ECU 50 performs the control of improving the cooling performance of the cooling mechanism 30 compared to that in the second reduced-cylinder range A2 set within the low load part of the reduced-cylinder operating range A (S10 to S12). Such a configuration has an advantage that the reduced-cylinder operation excellent in fuel consumption performance can be performed in a wider engine load range.

Specifically, in this embodiment, the cooling performance of the cooling mechanism 30 is improved and the temperature of the engine body 1 is reduced in the first reduced-cylinder range A1 where the engine load is relatively high within the reduced-cylinder operating range A where the number of active cylinders 2 is reduced. Therefore, even if the load corresponding to the first reduced-cylinder range A1 is high to some extent, it is not required to significantly retard the ignition timing to prevent knocking, and the reduced-cylinder operation excellent in fuel consumption performance can be performed continuously to a further higher engine load range.

For example, if the cooling performance is not improved in the first reduced-cylinder range A1 within the high load part, the temperature of each active cylinder may increase and knocking may occur. Such situation can be avoided by either reducing the upper limit load of the first reduced-cylinder range A1 (reference load L1) to narrow the reduced-cylinder operating range A, or significantly retarding the ignition timing to avoid knocking; however, the fuel consumption improvement effect cannot be obtained sufficiently in this case.

Figure 7:
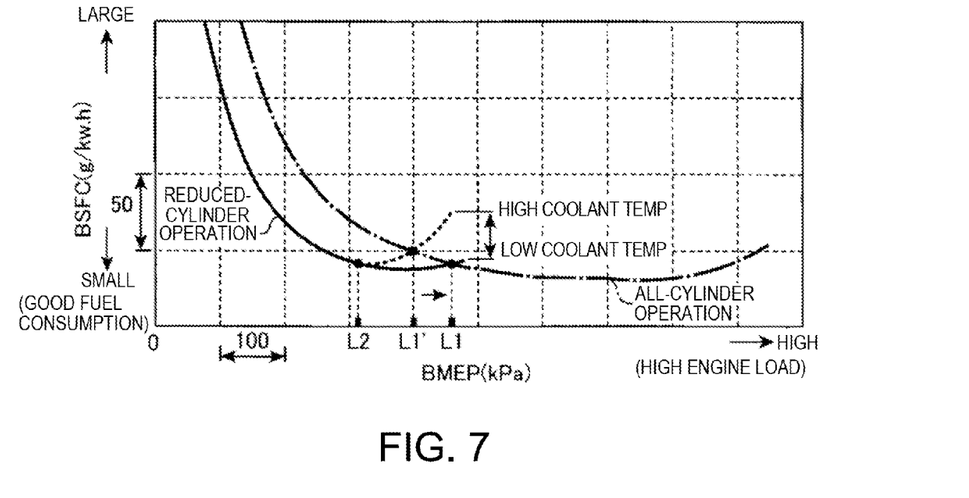
FIG. 7 is a chart illustrating fuel consumption performance of the engine.

FIG. 7 is a chart illustrating a relationship between a brake specific fuel consumption (BSFC) and a brake mean effective pressure (BMEP) when the engine is operated under a condition where the rotational speed is fixed, in which the value in the reduced-cylinder operation where only two of the cylinders are active is indicated by the solid wave line and the value in the all-cylinder operation where all of the four cylinders are active is indicated by the dashed wave line. Note that the BSFC in the vertical axis indicates that the fuel consumption is less as the value is lower, and the BMEP in the horizontal axis indicates that the engine load is higher as the value is larger.

As is clear from the chart in FIG. 7, when the reduced-cylinder operation is performed in the partial load range of the engine, the fuel consumption improves better than in the all-cylinder operation. Note that when the engine load becomes high, the fuel consumption in the reduced-cylinder operation will no longer improve but degrades worse than when the all-cylinder operation is performed under the same condition. In the chart in FIG. 7, the fuel consumption in the reduced-cylinder operation (solid line) and the fuel consumption in the all-cylinder operation are inverted in a high/low relationship at the load L1. The load L1 corresponds to the reference load L1 which is the upper limit load of the reduced-cylinder operating range A in the map of FIG. 4. In a range between the load L2 on the lower load side and the reference load L1, the value when the coolant temperature Tw is reduced to the low reference temperature $T_{low}$ described above is indicated by the solid line, and the value when the coolant temperature Tw is not reduced (set to the normal reference temperature $T_{high}$) is indicated by the broken line. The load L2 at the branching point into the solid and broken lines corresponds to the load L2 at the boundary between the first reduced-cylinder range A1 and the second reduced-cylinder range A2 in the map of FIG. 4.

In a range higher than the load L2, the fuel consumption when the coolant temperature Tw is high (broken line) is worse than the fuel consumption when the coolant temperature Tw is low (solid line) because the ignition timing is retarded to avoid knocking when the coolant temperature Tw is high. Specifically, when the ignition timing is retarded, since it is required to increase the amount of fuel injected to enrich an air-fuel ratio in order to obtain the same amount of torque (or suppress the temperature increase of the exhaust gas), the fuel consumption degrades. Under the condition where the coolant temperature Tw is high, since it is necessary to retard the ignition timing and the fuel consumption degrades as described above, even if the reduced-cylinder operation is performed, the fuel consumption in the reduced-cylinder operation and the fuel consumption in the all-cylinder operation are inverted in a high/low relationship at a load L1' which is lower than the reference load L1.

Whereas, when the coolant temperature Tw is reduced in the range higher than the load L2 (solid line), since knocking does not occur even if the retard amount of the ignition timing is reduced, compared to when the coolant temperature Tw is high (broken line), the ignition timing can be relatively advanced, and the equivalent amount of torque can be obtained with a lesser injection amount, which means even if the reduced-cylinder operation is continued to the load L1 which is higher than the load L1', a lesser fuel consumption can be achieved compared to the all-cylinder operation. For this reason, in this embodiment, between the load L2 and the load L1 (in the first reduced-cylinder range A1), the reduced-cylinder operation is performed while improving the cooling performance of the cooling mechanism 30 to reduce the coolant temperature Tw. Thus, the reduced-cylinder operation excellent in fuel consumption performance can be performed continuously to a further higher engine load range and the fuel consumption performance can sufficiently be improved.

Particularly, in the engine of this embodiment, since the geometric compression ratio of each cylinder 2 is set to 12:1 or higher which is slightly high for a gasoline engine, knocking naturally easily occurs. Therefore, performing the control of the coolant temperature Tw as described above means a great deal and, in combination with an improvement of thermal efficiency due to the high compression ratio, more excellent fuel consumption performance can be obtained.

Moreover, in this embodiment, even under the engine operation in the first reduced-cylinder range A1, if the gear range of the transmission 40 is low, the control of improving the cooling performance is not performed. Thus, the cooling performance can be improved without any unnecessary operation, under an appropriate condition taking a delay period of time required for the temperature of the engine body 1 to actually decrease into consideration. Specifically, when the gear range of the transmission 40 is low, the operating state of the engine shifts frequently and may be shifted up (the gear range may be changed to a high gear range) soon. Therefore, even if the cooling performance is improved when the gear range is low, when the temperature of each cylinder 2 of the engine body 1 is actually reduced, the operating range may have already been shifted to other than the first reduced-cylinder range A1, which will make the improvement of the cooling performance meaningless. On the other hand, as this embodiment, in the case where the control of improving the cooling performance is only allowed when the gear range of the transmission 40 is high, in other words, the shift of the operating state is gentle (i.e., in a state close to cruising) and it is assumed that the operating state will not go off a corresponding position in the first reduced-cylinder range A1 immediately, the temperature of the engine body 1 is considered that it can sufficiently be reduced even if some extent of delay period of time exists until the temperature of the engine body 1 actually decreases. Therefore, the control of improving the cooling performance will not be a waste.

Note that when the gear range of the transmission 40 is low, since the cooling performance cannot be improved even in the first reduced-cylinder range A1, the temperature of the engine body 1 is not reduced. Therefore, it is required to sufficiently retard the ignition timing to avoid knocking. However, even in this case, since the operating range remains within the first reduced-cylinder range A1 only for a short period of time, degradation of the fuel consumption caused by retarding the ignition timing is not a substantial problem.

Moreover, in this embodiment, the reduced-cylinder operating range A is set to the range where the engine speed is higher than the first predetermined reference speed R1, and the low-speed all-cylinder range B1 where the all-cylinder operation is performed is set on the lower speed side of the first reference speed R1. In the low-speed all-cylinder range B1, compared to the first reduced-cylinder range A1 described above, the cooling performance of the cooling mechanism 30 is set low (S23 and S24 in FIG. 6). According to such a configuration, under a condition where the flowability of the gas mixture inside the combustion chamber 10 easily degrades due to the low engine speed, the engine body 1 is not cooled unnecessarily and an increase in a generated amount of HC can be prevented.

Specifically, in the range where the engine speed is low, such as the low-speed all-cylinder range B1, since the moving speed of the piston 5 is slow and the flowability of the gas mixture inside the combustion chamber 10 is low, it easily takes long time to vaporize and atomize the fuel. Under such a condition, if the cooling performance of the cooling mechanism 30 is improved, the temperature of the engine body 1 is decreased and the vaporization and atomization of the fuel is interrupted more, resulting in increasing the generated amount of HC. On the other hand, in this embodiment, since the cooling performance of the cooling mechanism 30 is set low in the low-speed all-cylinder range B1, such a situation can be avoided and the increase in the generated amount of HC can be prevented appropriately.

Moreover, in this embodiment, the reduced-cylinder operating range A is set in the range where the engine speed is lower than the second predetermined reference speed R2 and the engine load is lower than the predetermined reference load L1. The high-speed all-cylinder range B2 and the high-load all-cylinder range B3 where the all-cylinder operation is performed are set on the higher speed side of the second reference speed R2 and the higher load side of the reference load L1, respectively. Further, in the high-speed all-cylinder range B2 and the high-load all-cylinder range B3, similarly to the first reduced-cylinder range A1 described above, the cooling performance of the cooling mechanism 30 is improved only when the gear range of the transmission 40 is higher than the predetermined range number (S25 to S27 in FIG. 6). When the cooling performance of the cooling mechanism 30 is improved in the all-cylinder operating ranges respectively set on the higher speed side and the higher load side of the reduced-cylinder operating range A (the high-speed all-cylinder range B2 and the high-load all-cylinder range B3), the occurrence of knocking can surely be prevented particularly in a part of the range B2 where the engine load is high and a part of the range B3 where the engine speed is high (i.e., the parts where knocking easily occurs).

Here, although it can also be considered to improve the cooling performance only in the respective parts of the high-speed all-cylinder range B2 and the high-load all-cylinder range B3 where knocking easily occurs, in this case, for example, when the operating state of the engine is shifted from a corresponding position in the first reduced-cylinder range A1 to either one of the high-speed all-cylinder range B2 and the high-load all-cylinder range B3, it becomes necessary to often change the cooling performance of the cooling mechanism 30 (e.g., change the cooling performance to high, to low, and then to high again). This not only complicates the control, but a problem also occurs with regard to responsiveness. Considering such a problem, in this embodiment, the cooling performance of the cooling mechanism 30 is improved throughout the high-speed all-cylinder range B2 and the high-load all-cylinder range B3. Thus, the occurrence of knocking can surely be prevented while avoiding the problem described above. Note that the reason why the control of improving the cooling performance is prohibited when the gear range of the transmission 40 is low is because, similar to the case in the first reduced-cylinder range A1 described above, the operating state of the engine shifts frequently in the low gear range and there is a possibility that it will soon shift to correspond to a position in a different operating range. When the gear range is low, knocking is prevented by temporarily retarding the ignition timing.

Moreover, in this embodiment, the cooling mechanism 30 includes the coolant path 32 where the coolant circulates, the radiator 33 for cooling the coolant by the heat exchange, and the switch valve 34 for allowing the coolant to flow into the radiator 33 through the coolant path 32 by opening the valve when the coolant temperature is higher than the predetermined reference temperature. The ECU 50 performs the control of reducing the reference temperature (to the temperature $T_{low}$) as the control of improving the cooling performance of the cooling mechanism 30 described above. According to such a configuration, the cooling performance of the cooling mechanism 30 can appropriately be adjusted with the simple configuration where the reference temperature, which is the temperature at which the switch valve 34 is opened, is changed.

Note that in this embodiment, the cooling performance of the cooling mechanism 30 is improved by reducing the reference temperature at which the switch valve 34 is opened (i.e., allowing the coolant to flow into the radiator 33 at a lower temperature); however, the cooling performance may also be improved by other methods which are not dependent on changing the reference temperature as described above. For example, when the radiator 33 is disposed rearward of the front grille, the cooling performance can be controlled by providing a grille shutter for changing an opening in the air port formed in the front grille, and opening or closing the grille shutter to change the flow rate of travel air blown to the radiator 33. Alternatively, the cooling performance can be controlled by providing an electric pump driven by an electric motor as the coolant pump 31, and adjusting the speed of the electric motor to change the flow rate of the coolant.

Moreover, in this embodiment, the geometric compression ratio of the engine body 1 is set to 12:1 or higher; however, when gasoline with high octane number RON (Research Octane Number) is used as the fuel, since abnormal combustion (e.g., knocking) is relatively unlikely to occur, the geometric compression ratio may be set higher. Specifically, when gasoline with an octane number of 95 or more is used as the fuel, the geometric compression ratio may be 13:1 or higher. On the other hand, when the octane number is 91 or higher but lower than 95, the geometric compression ratio is still preferable to be 12:1 or higher.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine Body
2 Cylinder
15 Crankshaft (Output Shaft)
30 Cooling Mechanism
32 Coolant Path
33 Radiator
34 Switch Valve
40 Transmission
50 ECU (Controller)

A Reduced-cylinder Operating Range
A1 First Reduced-cylinder Range
A2 Second Reduced-cylinder Range
B1 Low-speed All-cylinder Range
B2 High-speed All-cylinder Range
B3 High-load All-cylinder Range
R1 First Reference Temperature
R2 Second Reference Temperature

What is claimed is:

1. A variable cylinder engine, comprising:
an engine body having a plurality of cylinders;
a cooling mechanism for cooling the engine body; and
a controller for controlling the cooling mechanism and changing a number of active cylinders according to an operating state of the engine, for determining an engine load and an engine speed based on an engine speed sensor, an airflow sensor, and an accelerator sensor, and for controlling injectors, ignition plugs, and valve stopping mechanism parts to deactivate the active cylinders,
wherein the controller reduces the number of the active cylinders in a reduced-cylinder operating range set within a partial engine load range, the partial engine load range having a lower engine load than a high-load all-cylinder operating range, dividing the reduced-cylinder operating range into a first reduced-cylinder operating range set within a high load part and a second reduced-cylinder operating range set within a low load part, and in the first reduced-cylinder range set within the high load part of the reduced-cylinder operating range, the controller improves a cooling performance of the cooling mechanism, compared with that in the second reduced-cylinder range set within the low load part of the reduced-cylinder operating range, by reducing a reference temperature above which the cooling mechanism is configured to flow coolant to cool the active cylinders.

2. The engine of claim 1, wherein the reduced-cylinder operating range is set to a range where an engine speed is higher than a first predetermined reference speed, and
wherein in an engine operation within a low-speed all-cylinder range where the engine speed is lower than the first reference speed, the cooling performance of the cooling mechanism is lower than that in the first reduced-cylinder range.

3. The engine of claim 2, wherein the reduced-cylinder operating range is set to a range where the engine speed is lower than a second predetermined reference speed, and
wherein in the engine operation within a high-speed all-cylinder range where the engine speed is higher than the second reference speed, the controller improves the cooling performance of the cooling mechanism similarly to the first reduced-cylinder range.

4. The engine of claim 3, wherein the engine is a vehicle engine to be installed in a vehicle,
wherein an output shaft of the engine body is coupled to wheels via a transmission provided with a plurality of gear ranges, and
wherein the controller improves the cooling performance of the cooling mechanism only when the gear range of the transmission is higher than a predetermined range.

5. The engine of claim 3, wherein the cooling mechanism includes:
a coolant path where a coolant circulates;
a radiator for cooling the coolant by a heat exchange; and
a switch valve for allowing the coolant to flow into the radiator through the coolant path by opening when a coolant temperature is higher than a predetermined reference temperature, and
wherein the controller improves the cooling performance of the cooling mechanism by reducing the reference temperature.

6. The engine of claim 2, wherein in the engine operation within a high-load all-cylinder range where the engine load is higher than the reduced-cylinder operating range, the controller improves the cooling performance of the cooling mechanism similarly to the first reduced-cylinder range.

7. The engine of claim 2, wherein the engine is a vehicle engine to be installed in a vehicle,
wherein an output shaft of the engine body is coupled to wheels via a transmission provided with a plurality of gear ranges, and
wherein the controller improves the cooling performance of the cooling mechanism only when the gear range of the transmission is higher than a predetermined range.

8. The engine of claim 2, wherein the cooling mechanism includes:
a coolant path where a coolant circulates;
a radiator for cooling the coolant by a heat exchange; and
a switch valve for allowing the coolant to flow into the radiator through the coolant path by opening when a coolant temperature is higher than a predetermined reference temperature, and
wherein the controller improves the cooling performance of the cooling mechanism by reducing the reference temperature.

9. The engine of claim 1, wherein the reduced-cylinder operating range is set to a range where an engine speed is lower than a second predetermined reference speed, and
wherein in an engine operation within a high-speed all-cylinder range where the engine speed is higher than the second reference speed, the controller improves the cooling performance of the cooling mechanism similarly to the first reduced-cylinder range.

10. The engine of claim 9, wherein in the engine operation within a high-load all-cylinder range where the engine load is higher than the reduced-cylinder operating range, the controller improves the cooling performance of the cooling mechanism similarly to the first reduced-cylinder range.

11. The engine of claim 9, wherein the engine is a vehicle engine to be installed in a vehicle,
wherein an output shaft of the engine body is coupled to wheels via a transmission provided with a plurality of gear ranges, and
wherein the controller improves the cooling performance of the cooling mechanism only when the gear range of the transmission is higher than a predetermined range.

12. The engine of claim 9, wherein the cooling mechanism includes:
a coolant path where a coolant circulates;
a radiator for cooling the coolant by a heat exchange; and
a switch valve for allowing the coolant to flow into the radiator through the coolant path by opening when a coolant temperature is higher than a predetermined reference temperature, and
wherein the controller improves the cooling performance of the cooling mechanism by reducing the reference temperature.

13. The engine of claim 1, wherein in an engine operation within a high-load all-cylinder range where the engine load is higher than the reduced-cylinder operating range, the controller improves the cooling performance of the cooling mechanism similarly to the first reduced-cylinder range.

14. The engine of claim 13, wherein the cooling mechanism includes:
a coolant path where a coolant circulates;
a radiator for cooling the coolant by a heat exchange; and
a switch valve for allowing the coolant to flow into the radiator through the coolant path by opening when a coolant temperature is higher than a predetermined reference temperature, and wherein the controller improves the cooling performance of the cooling mechanism by reducing the reference temperature.

15. The engine of claim 1, wherein the engine is a vehicle engine to be installed in a vehicle,
wherein an output shaft of the engine body is coupled to wheels via a transmission provided with a plurality of gear ranges, and
wherein the controller improves the cooling performance of the cooling mechanism only when the gear range of the transmission is higher than a predetermined range.

16. The engine of claim 1, wherein the cooling mechanism includes:
a coolant path where a coolant circulates;
a radiator for cooling the coolant by a heat exchange; and
a switch valve for allowing the coolant to flow into the radiator through the coolant path by opening when a coolant temperature is higher than a predetermined reference temperature, and
wherein the controller improves the cooling performance of the cooling mechanism by reducing the reference temperature.

17. The engine of claim 1, wherein a retard amount of an ignition timing is reduced in a case where the cooling performance of the cooling mechanism in the reduced-cylinder operating range is set high, compared to a case where the cooling performance of the cooling mechanism is not set high.

18. A variable cylinder engine, comprising:
an engine body having a plurality of cylinders;
a cooling mechanism for cooling the engine body; and
a controller for controlling the cooling mechanism and changing a number of active cylinders according to an operating state of the engine,
wherein the controller reduces the number of the active cylinders in a reduced-cylinder operating range set within a partial engine load range, the partial engine load range having a lower engine load than a high-load all-cylinder operating range, dividing the reduced-cylinder operating range into a first reduced-cylinder operating range set within a high load part and a second reduced-cylinder operating range set within a low load part, and in the first reduced-cylinder range set within the high load part of the reduced-cylinder operating range, the controller improves a cooling performance of the cooling mechanism, compared with that in the second reduced-cylinder range set within the low load part of the reduced-cylinder operating range.

19. A variable cylinder engine, comprising:
an engine body having a plurality of cylinders;
a cooling mechanism for cooling the engine body; and
a controller for controlling the cooling mechanism and changing a number of active cylinders according to an operating state of the engine,
wherein the controller reduces the number of the active cylinders in a reduced-cylinder operating range set within a partial engine load range, the partial engine load range having a lower engine load than a high-load all-cylinder operating range, dividing the reduced-cylinder operating range into a first reduced-cylinder operating range set within a high load part and a second reduced-cylinder operating range set within a low load part, and in the first reduced-cylinder range set within the high load part of the reduced-cylinder operating range, the controller improves a cooling performance of the cooling mechanism, compared with that in the second reduced-cylinder range set within the low load part of the reduced-cylinder operating range,
wherein the reduced-cylinder operating range is set to a range where an engine speed is higher than a first predetermined reference speed,
wherein in an engine operation within a low-speed all-cylinder range where the engine speed is lower than the first reference speed, the cooling performance of the cooling mechanism is lower than that in the first reduced-cylinder range,
wherein the reduced-cylinder operating range is set to a range where an engine speed is lower than a second predetermined reference speed,
wherein in an engine operation within a high-speed all-cylinder range where the engine speed is higher than the second reference speed, the controller improves the cooling performance of the cooling mechanism similarly to the first reduced-cylinder range, and
wherein in an engine operation within a high-load all-cylinder range where the engine load is higher than the reduced-cylinder operating range, the controller improves the cooling performance of the cooling mechanism similarly to the first reduced-cylinder range.

20. A variable cylinder engine, comprising:
an engine body having a plurality of cylinders;
a cooling mechanism for cooling the engine body; and
a controller for controlling the cooling mechanism and changing a number of active cylinders according to an operating state of the engine,
wherein the controller reduces the number of the active cylinders in a reduced-cylinder operating range set within a partial engine load range, the partial engine load range having a lower engine load than a high-load all-cylinder operating range, dividing the reduced-cylinder operating range into a first reduced-cylinder operating range set within a high load part and a second reduced-cylinder operating range set within a low load part, and in the first reduced-cylinder range set within the high load part of the reduced-cylinder operating range, the controller improves a cooling performance of the cooling mechanism, compared with that in the second reduced-cylinder range set within the low load part of the reduced-cylinder operating range,
wherein the cooling mechanism includes:
a coolant path where a coolant circulates through all the cylinders in series, regardless of whether the number of active cylinders is set in an all-cylinder operating range or a reduced-cylinder operating range;
a radiator for cooling the coolant by a heat exchange;
a switch valve for allowing the coolant to flow into the radiator through the coolant path by opening when a coolant temperature is higher than a predetermined reference temperature, and
wherein the controller improves the cooling performance of the cooling mechanism by reducing the reference temperature.

* * * * *